US009616724B2

(12) United States Patent
Ariga et al.

(10) Patent No.: US 9,616,724 B2
(45) Date of Patent: Apr. 11, 2017

(54) SUBFRAME STRUCTURE FOR VEHICLE

(71) Applicant: HONDA MOTOR CO., LTD., Tokyo (JP)

(72) Inventors: Yohei Ariga, Wako (JP); Kazuomi Kawato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/009,440

(22) Filed: Jan. 28, 2016

(65) Prior Publication Data
US 2016/0221405 A1 Aug. 4, 2016

(30) Foreign Application Priority Data

Jan. 29, 2015 (JP) .................................. 2015-015811

(51) Int. Cl.
*B60G 7/00* (2006.01)
*B62D 21/11* (2006.01)
*B62D 17/00* (2006.01)

(52) U.S. Cl.
CPC ............. *B60G 7/001* (2013.01); *B62D 17/00* (2013.01); *B62D 21/11* (2013.01)

(58) Field of Classification Search
CPC ................ B60G 7/02; B60G 2200/142; B60G 2204/143; B60G 2204/4302; B60G 2206/012; B60G 2206/124; B60G 2206/604; B62D 21/11
USPC ..... 280/124.109, 124.134, 124.135, 124.136
See application file for complete search history.

(56) References Cited

U.S. PATENT DOCUMENTS

| 4,451,054 | A | * | 5/1984 | Allison | B60G 21/04 280/104 |
| 5,016,903 | A | * | 5/1991 | Kijima | B60G 7/02 267/258 |
| 5,921,568 | A | * | 7/1999 | Cruise | B60G 11/23 267/279 |
| 6,170,875 | B1 | * | 1/2001 | Jones | B60G 7/02 280/124.134 |
| 7,188,850 | B2 | * | 3/2007 | Ziech | B60G 9/00 280/124.125 |
| 2002/0063408 | A1 | * | 5/2002 | Klais | B60G 7/02 280/124.134 |

(Continued)

FOREIGN PATENT DOCUMENTS

JP 9-39831 A 2/1997

*Primary Examiner* — Toan To
(74) *Attorney, Agent, or Firm* — Westerman, Hattori, Daniels & Adrian, LLP

(57) ABSTRACT

A subframe structure for a vehicle attaches a lower arm to a cross member extending in the vehicle width direction, the lower arm extending in the vehicle width direction and being configured to move rotationally about a predetermined rotational axis to support a knuckle such that the knuckle can be displaced in the vehicle height direction. The subframe structure includes a cylindrical bush whose central axis is aligned with the rotational axis. The cross member has an arm attaching hole that retains the bush such that the bush is rotatable about the rotational axis. The lower arm is fixed to the bush at a position on the rotational axis. The arm attaching hole opens downward in the vehicle height direction. The cross member retains the bush such that a part of the outer surface of the bush protrudes downward in the vehicle height direction beyond a lower end portion.

7 Claims, 4 Drawing Sheets

(56) References Cited

U.S. PATENT DOCUMENTS

| | | | |
|---|---|---|---|
| 2008/0067774 A1* | 3/2008 | Sanville | B60G 3/20 280/124.138 |
| 2008/0303234 A1* | 12/2008 | McCann | B60G 3/06 280/93.511 |
| 2012/0007329 A1* | 1/2012 | Hopson | B60G 7/005 280/124.134 |
| 2013/0241167 A1* | 9/2013 | Perri | B60G 11/08 280/124.134 |
| 2014/0049017 A1* | 2/2014 | Buchwitz | G06F 17/30424 280/124.134 |
| 2016/0297267 A1* | 10/2016 | Hinz | B60G 3/06 |
| 2016/0297268 A1* | 10/2016 | Hinz | B60G 3/06 |

* cited by examiner

SUBFRAME STRUCTURE FOR VEHICLE

CROSS REFERENCES TO RELATED APPLICATIONS

The present application claims priority under 35 U.S.C. §119 to Japanese Patent Application 2015-015811, filed Jan. 29, 2015, entitled "Subframe Structure for Vehicle." The contents of this application are incorporated herein by reference in their entirety.

BACKGROUND

1. Field

The present disclosure relates to a subframe structure for a vehicle.

2. Description of the Related Art

Japanese Unexamined Patent Application Publication No. 9-039831 describes a suspension bracket attaching structure (a subframe structure for a vehicle) in which a suspension arm (lower arm) is attached to a suspension bracket. The suspension bracket is welded on the inside of a cross member formed by a channel steel member that is open on its underside and has a substantially U-shaped cross-section.

In the attaching structure described in Japanese Unexamined Patent Application Publication No. 9-039831, the boss part of the suspension arm is bolted into a bolt insertion hole, which is provided in a lower part of the suspension bracket attached to the cross member by welding and extends through a side plate part of the suspension bracket.

If the position of the bolt insertion hole can be further lowered in the attaching structure described in Japanese Unexamined Patent Application Publication No. 9-039831, the attached position of the arm can be further lowered, leading to improved freedom of geometry of the suspension arm.

SUMMARY

It is desirable to provide a subframe structure for a vehicle which allows a lower arm to be positioned as low as possible with respect to a cross member.

According to an embodiment of the present disclosure, there is provided a subframe structure for a vehicle which attaches a lower arm to a cross member that extends in a width direction of the vehicle, the lower arm extending in the width direction of the vehicle, the lower arm being configured to move rotationally about a predetermined rotational axis to support a wheel support member in a manner that allows the wheel support member to be displaced in a height direction of the vehicle. The subframe structure includes a bush that is cylindrically shaped, and has a central axis aligned with the rotational axis. The cross member has an attaching hole that retains the bush in a manner that allows the bush to rotate about the rotational axis. The lower arm is fixed to the bush at a position on the rotational axis. The attaching hole is formed at a lower portion of the cross member such that it has an opening that opens along its axial direction and downward in the height direction of the vehicle. The cross member retains the bush in such a manner that a part of an outer surface of the bush protrudes downward in the height direction of the vehicle beyond a lower end portion of the cross member.

According to the embodiment, the bush to which the lower arm is attached and about which the lower arm moves rotationally, can be disposed at a low position with respect to the cross member. Consequently, the center of rotational movement of the lower arm is located at a low position with respect to the cross member. This allows the lower arm to be positioned as low as possible with respect to the cross member.

In an embodiment of the present disclosure, the cross member may have a device attaching portion, and the subframe structure may further include a toe angle changing device that changes a toe angle of a wheel supported on the wheel support member, the toe angle changing device being attached to the device attaching portion of the cross member, and a reinforcing member that bridges between an area in the vicinity of the device attaching portion and an area in the vicinity of the attaching hole to reinforce the cross member.

According to the embodiment, the cross member is reinforced in the area between the vicinity of the device attaching portion, which is a portion of the cross member where the toe angle changing device that changes the toe angle of the wheel is attached, and the vicinity of the attaching hole in which the bush is attached. Consequently, vibrations caused by swinging movement of the lower arm are effectively suppressed, leading to improved drive feel for the driver.

Since the cross member is reinforced at the position where the toe angle changing device is attached, the toe angle changing device is securely fixed in place.

Further, the toe angle changing device is attached to the cross member, thus allowing the subframe structure for a vehicle to be made compact.

In an embodiment of the present disclosure, the reinforcing member may be an attaching plate that attaches the toe angle changing device to the cross member.

According to the embodiment, the cross member is reinforced by the attaching plate that attaches the toe angle changing device to the cross member, thus eliminating the need for another component that serves as a reinforcing member. This simplifies the construction of the subframe structure for a vehicle.

In an embodiment of the present disclosure, the cross member may have an arm support portion in the lower end portion, the arm support portion bulging downward in the height direction of the vehicle, and the attaching hole may be provided in the arm support portion.

According to the embodiment, the attaching hole for retaining the bush is positioned as low as possible in the cross member. Consequently, the lower arm can be positioned as low as possible with respect to the cross member.

In an embodiment of the present disclosure, the subframe structure may further include an attaching tube member that has a cylindrical shape, the attaching tube member being retained in the attaching hole, and the bush may be accommodated in the attaching tube member in a manner that allows the bush to rotate about the rotational axis.

According to the embodiment, the bush becomes rotatable with respect to the cross member when accommodated in the attaching tube member that is fixed in the attaching hole. This simplifies the construction of the subframe structure for a vehicle.

In an embodiment of the present disclosure, the cross member may retain the attaching tube member so as to embrace the attaching tube member in the attaching hole.

According to the embodiment, the attaching tube member is retained so as to be embraced by the cross member. Thus, the attaching tube member is securely retained by the cross member.

In an embodiment of the present disclosure, the lower arm may divide into two branching parts at an end, and the lower arm may be fixed to the bush in a state in which the bush is sandwiched between the two branching parts of the lower arm.

According to the embodiment, the bush can be sandwiched by the two branching parts of the lower arm, and the lower arm can be fixed to the bush in that state. This allows the lower arm to be attached to the bush by a simple structure. Consequently, the construction of the subframe structure for a vehicle can be simplified.

DESCRIPTION OF THE PREFERRED EMBODIMENTS

Hereinafter, embodiments of the present disclosure will be described in detail while referring to the figures as appropriate.

Figure 1:
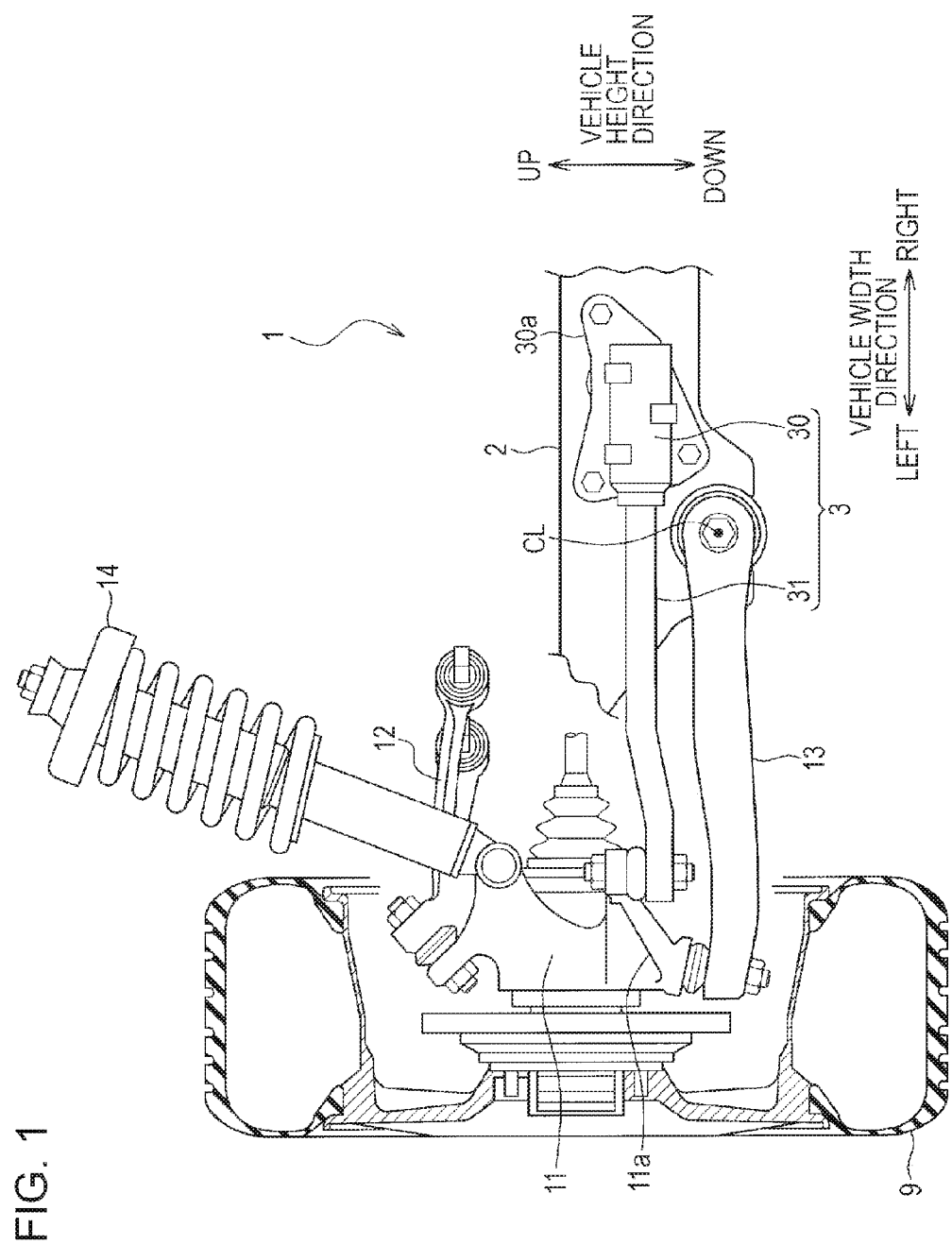
FIG. 1 illustrates the structure of a rear portion of a vehicle that employs a subframe structure for a vehicle according to an embodiment of the present disclosure.

FIG. 1 illustrates the structure of a rear portion of a vehicle that employs a subframe structure for a vehicle according to an embodiment of the present disclosure.

As illustrated in FIG. 1, a wheel support member (a knuckle 11), which supports a rear wheel 9 of a vehicle (not illustrated) in a rotatable manner, is attached to a frame (a cross member 2) of the vehicle by using a subframe structure for a vehicle 1 according to this embodiment. The cross member 2 is provided at the rear of the vehicle so as to extend in the width direction of the vehicle.

FIG. 1 illustrates the subframe structure for a vehicle 1 as seen from the rear in the front-rear direction (to be referred to as "longitudinal direction" hereinafter) of the vehicle. The rear wheel 9 illustrated in FIG. 1 is a rear wheel on the left side in the width direction of the vehicle. Although not illustrated, the vehicle has the same subframe structure for a vehicle 1 on the right side in the width direction of the vehicle. The subframe structure for a vehicle 1 on the right side and the subframe structure for a vehicle 1 on the left side illustrated in FIG. 1 are bilaterally symmetrical.

The terms left side and right side as used in this embodiment respectively refer to the left side in the width direction of the vehicle and the right side in the width direction of the vehicle when the vehicle is seen from the rear.

An upper arm 12 is connected to an upper part of the knuckle 11 with respect to the top-bottom direction (to be referred to as "height direction" hereinafter) of the vehicle, and a lower arm 13 is connected to a lower part of the knuckle 11 with respect to the height direction of the vehicle. The upper arm 12 and the lower arm 13 are attached to the cross member 2.

The upper arm 12 is attached to the cross member 2 in such a manner that the upper arm 12 is able to rotationally move upward and downward. The upper arm 12 extends in the width direction of the vehicle toward the knuckle 11. The lower arm 13 is attached to the cross member 2 in such a manner that the lower arm 13 is able to rotationally move upward and downward about the rotational axis CL. The lower arm 13 extends in the width direction of the vehicle toward the knuckle 11. The knuckle 11 is supported by the upper arm 12 and the lower arm 13 configured as mentioned above, thus allowing the knuckle 11 to be displaced upward and downward with respect to the cross member 2.

The knuckle 11 is connected with a damper 14. One end of the damper 14 is attached to an upper part of the knuckle 11, and the other end is fixed to the frame (not illustrated) of the vehicle at a position above the knuckle 11. The damper 14 reduces vibration of the knuckle 11 (the rear wheel 9) in the height direction of the vehicle.

The subframe structure for a vehicle 1 according to this embodiment is equipped with a rear toe control (RTC) device 3. The RTC device 3 is a toe angle changing device that changes the toe angle of the rear wheel 9. The toe angle of the rear wheel 9 can be changed by the RTC device 3.

The RTC device 3 is equipped with an electric actuator 30. The electric actuator 30 has an extensible rod 31. The extensible rod 31 extends in the width direction of the vehicle toward the knuckle 11. A distal end of the extensible rod 31 is connected to an arm portion 11a of the knuckle 11. The electric actuator 30 displaces the extensible rod 31 in the width direction of the vehicle in accordance with an instruction from a controller (not illustrated). The arm portion 11a, which is connected with the extensible rod 31, extends rearward with respect to the knuckle 11.

The knuckle 11 according to this embodiment is attached to a frame (not illustrated) via a rotating shaft (not illustrated) whose axis is aligned with the height direction of the vehicle, in a manner that allows rotational movement of the knuckle 11. Consequently, displacement of the extensible rod 31 in the width direction of the vehicle causes the arm portion 11a to swing in the width direction of the vehicle about the rotating shaft (not illustrated). The swinging movement of the arm portion 11a causes the rear wheel 9 to turn to change the toe angle of the rear wheel 9. The electric actuator 30 according to this embodiment is attached to the cross member 2 by use of an attaching plate 30a.

Figure 2:
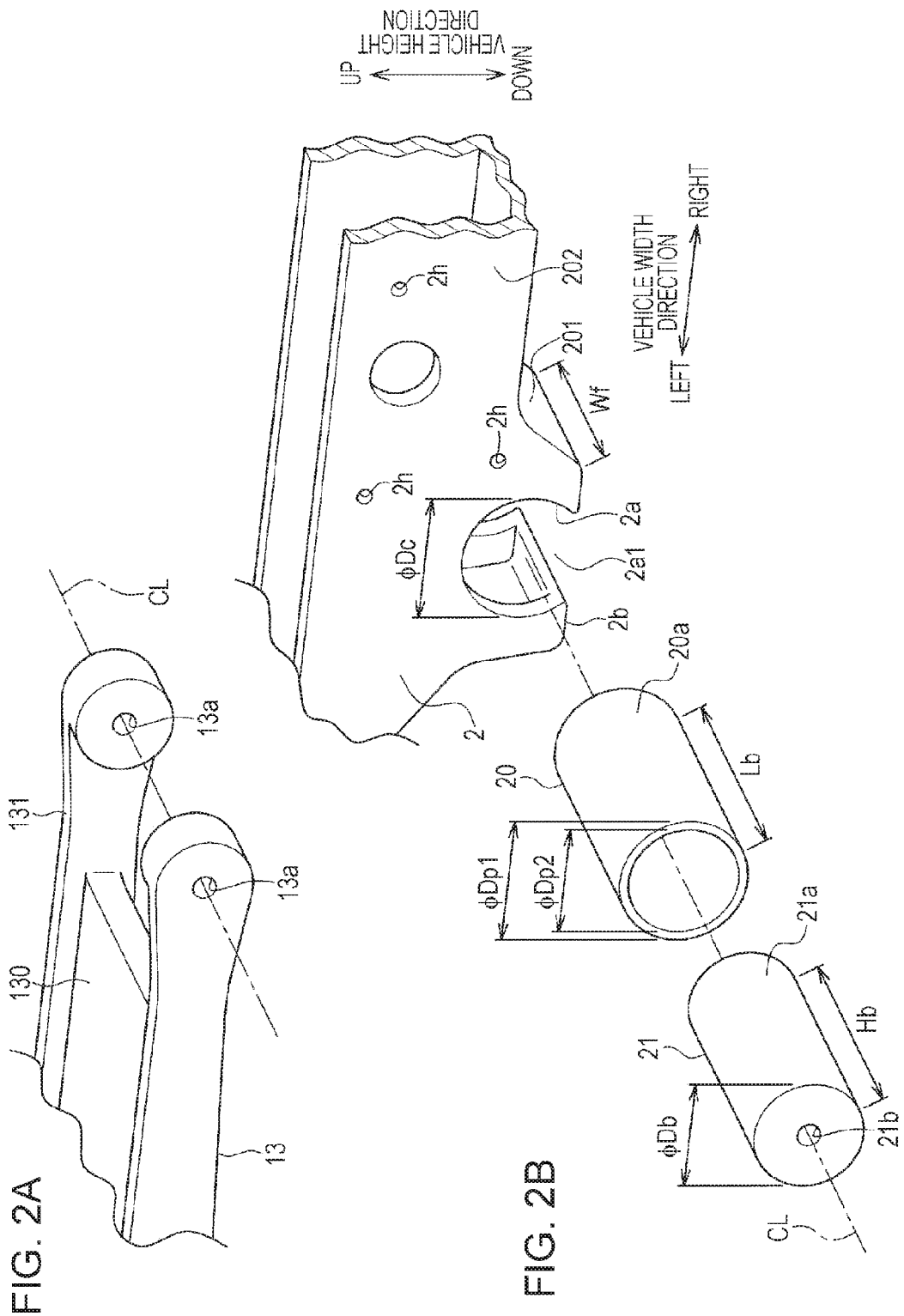
FIG. 2A is a perspective view illustrating the structure of an end portion of a lower arm.
FIG. 2B illustrates a lower-arm attaching portion of a cross member.
Figure 3:
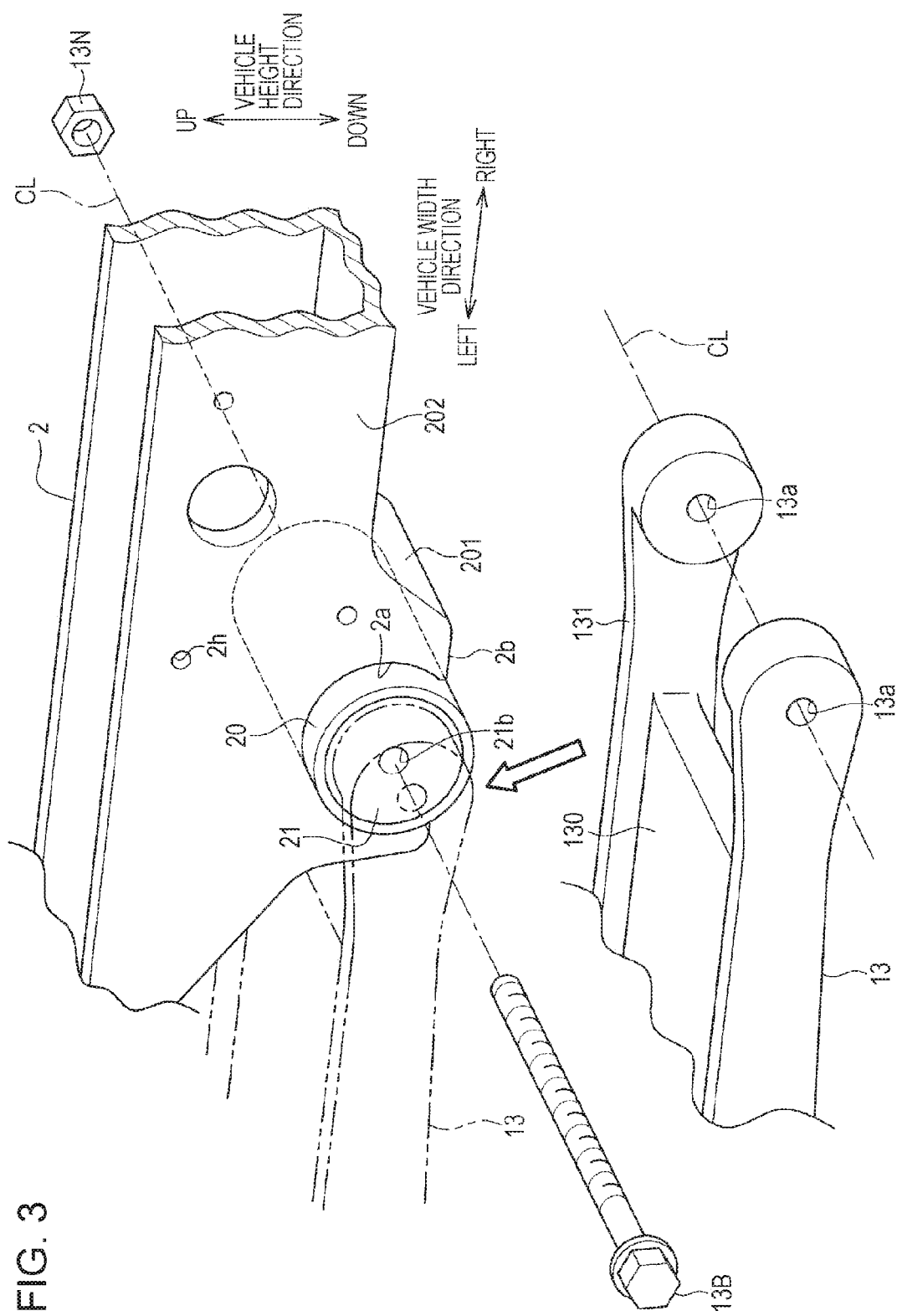
FIG. 3 is a perspective view illustrating how a lower arm is attached to a bush.

FIG. 2A is a perspective view illustrating the structure of an end portion of the lower arm, and FIG. 2B illustrates a lower-arm attaching portion of the cross member. FIG. 3 is a perspective view illustrating how the lower arm is attached to a bush.

As illustrated in FIG. 2A, the lower arm 13 according to this embodiment is formed by a steel member with two wall portions 131 provided at opposite ends of a base portion 130 that is flat-shaped. The two wall portions 131 are provided upright with respect to the base portion 130. Thus, the lower arm 13 has a substantially H-shaped cross-section. The two wall portions 131 are opposed to each other.

An end of the lower arm 13 near the cross member 2 (see FIG. 1) divides into two branching parts. Specifically, the base portion 130 is not provided at one end of the lower arm 13, so that a gap is present between the two wall portions 131 that are opposed to each other. The presence of this gap causes the lower arm 13 to divide into two branching parts at one end. The two opposed wall portions 131 may be curved outward away each other at one end. Further, two attaching holes 13a are provided, one in each of the two branching end portions that are opposed to each other. Each of the two attaching holes 13a extends through the corresponding wall portion 131. The two attaching holes 13a are arranged on a predetermined axis (a rotational axis CL). That is, the two attaching holes 13a are arranged in series on the rotational axis CL.

As illustrated in FIG. 2B, the cross member 2 is a frame member having a predetermined thickness (a frame thickness Wf). The cross member 2, which is a frame having a thickness (the frame thickness Wf) in the longitudinal direction of the vehicle, extends in the width direction of the vehicle. For example, as illustrated in FIG. 3, the cross member 2 is formed by a steel sheet with a U-shaped cross-section that is open at the top. A lower part (a lower end portion 201) of the cross member 2 partially bulges downward. This bulging portion serves as an arm support portion 2b. The arm support portion 2b is provided with an attaching hole (an arm attaching hole 2a).

The arm attaching hole 2a is a hole (through-hole) that extends through the arm support portion 2b in the direction of the frame thickness Wf. If the cross member 2 extends in the width direction of the vehicle, the arm attaching hole 2a extends through the cross member 2 in the longitudinal direction of the vehicle.

In this embodiment, the shape of the arm attaching hole 2a is such that a lower part of a circular through-hole centered on the rotational axis CL is partially exposed. That is, the arm attaching hole 2a is formed as an arcuate (partially circular) cut that is provided in the arm support portion 2b so as to extend upward in a circular shape from the lower end portion 201. The rotational axis CL passing through the arm attaching hole 2a extends in the longitudinal direction of the vehicle.

In this embodiment, the rotational axis CL passing through the arm attaching hole 2a is aligned with the rotational axis CL passing through the two attaching holes 13a (see FIG. 2A) provided in the lower arm 13 (see FIG. 2A). The arm attaching hole 2a has an exposed portion 2a1 located below the rotational axis CL. That is, the shape of the arm attaching hole 2a is such that the portion of a circular through-hole which is located below the rotational axis CL is partially exposed. In other words, the portion of the arm attaching hole 2a which is narrowed along its circular shape is partially exposed in a lower part, defining the exposed portion 2a1. In this embodiment, the exposed portion 2a1 is the portion where the arm attaching hole 2a (attaching hole) is exposed.

An attaching tube member (an arm attaching tube member 20) having a cylindrical shape is attached in the arm attaching hole 2a. The arm attaching tube member 20 is open at both ends. The arm attaching tube member 20 is inserted into the arm attaching hole 2a, and then secured to the cross member 2 by welding or brazing. The exposed portion 2a1 is provided in a lower part of the arm attaching hole 2a. The lower end portion 201 of the cross member 2 is narrowed in the exposed portion 2a1 (the portion where the arm attaching hole 2a is exposed) of the arm attaching hole 2a. Thus, the arm attaching tube member 20 inserted in the arm attaching hole 2a is supported from below by the narrowed ends of the exposed portion 2a1. Consequently, the arm attaching tube member 20 is retained so as to be embraced by the cross member 2, ensuring secure retention of the arm attaching tube member 20 by the cross member 2 (the arm attaching hole 2a).

In this embodiment, a bush 21 is inserted into the arm attaching tube member 20. The bush 21 is accommodated inside the arm attaching tube member 20 in such a manner that the bush 21 is rotatable about the rotational axis CL. In this embodiment, the cross member 2 thus retains the bush 21 in a manner that allows the bush 21 to rotate about the rotational axis CL.

The present disclosure is not limited to the above configuration. Alternatively, the bush 21 may be directly inserted into the arm attaching hole 2a. That is, in an alternative configuration, the arm attaching tube member 20 may not be provided, and the cross member 2 may directly retain the bush 21. This configuration makes it possible to eliminate the cost (component cost) of the arm attaching tube member 20. In this case, a part of an outer surface 21a of the bush 21 does not contact the arm attaching hole 2a, thus reducing the area of contact between the bush 21 and the arm attaching hole 2a. This reduced area of contact equates to less friction between the cross member 2 and the bush 21, leading to smooth rotation of the bush 21 and therefore smooth swinging movement of the lower arm 13.

The above configuration allows the bush 21 to be retained in such a manner that the bush 21 is embraced by the cross member 2. This ensures secure retention of the bush 21 by the cross member 2 (the arm attaching hole 2a).

The bush 21 is made of, for example, hard rubber, and has a cylindrical shape whose central axis is aligned with the rotational axis CL. The height Hb along the rotational axis CL of the bush 21 is greater than or equal to the length Lb along the rotational axis CL of the arm attaching tube member 20, so that opposite ends of the bush 21 accommodated in the arm attaching tube member 20 protrude from the arm attaching tube member 20. In the lower arm 13 illustrated in FIG. 2A, the distance between the two branching parts at an end of the lower arm 13 (the distance between the two wall portions 131 at an end of the lower arm 13) is made equal to the height Hb of the bush 21. For example, as illustrated in FIG. 2A, the two branching parts at an end of the lower arm 13 may bulge inward, and the distance between the two branching parts may be made equal to the height Hb of the bush 21(see FIG. 2B).

The bush 21 has a through-hole 21b that extends through the bush 21 along the rotational axis CL. The through-hole 21b is positioned so as to extend through the center of the bush 21.

In this embodiment, the inside diameter φDc of the arm attaching hole 2a is substantially equal to the outside diameter φDp1 of the arm attaching tube member 20 (φDc=φDp1). Further, the inside diameter φDp2 of the arm attaching tube member 20 is substantially equal to the outside diameter φDb of the bush 21 (φDp2≈φDc). Consequently, the arm attaching tube member 20 fits into the arm attaching hole 2a so as to be fixed in the arm attaching hole 2a. The bush 21 is rotatably accommodated in the arm attaching tube member 20.

When the arm attaching tube member 20 is fixed in the arm attaching hole 2a of the cross member 2, an outer surface 20a of the arm attaching tube member 20 protrudes downward beyond the lower end portion 201 of the cross member 2 at the position of the exposed portion 2a1. Further, when accommodated in the arm attaching tube member 20 fixed in the arm attaching hole 2a, the outer surface 21a of the bush 21 protrudes downward beyond the lower end portion 201 of the cross member 2.

As illustrated in FIG. 2B, the cross member 2 is provided with actuator attaching holes 2h. Specifically, the actuator attaching holes 2h are provided on one side of the cross member 2 (a rear side 202) which faces rearward. The actuator attaching holes 2h have a female thread. A fixing member (for example, a fastening bolt 30B illustrated in FIG. 4) for fastening the attaching plate 30a (see FIG. 1) of the electric actuator 30 is screwed into the female thread.

In this embodiment, the actuator attaching holes 2h serve as a device attaching portion for attaching the electric actuator 30 to the cross member 2. The actuator attaching holes 2h (device attaching portion) are located in the vicinity of the arm attaching hole 2a.

In this embodiment, all of the actuator attaching holes 2h are located on the right side of the arm attaching hole 2a, which is located on the left side in the width direction of the vehicle. That is, all of the actuator attaching holes 2h are located nearer to the center in the width direction of the vehicle than is the arm attaching hole 2a.

As illustrated in FIG. 3, the arm attaching tube member 20 is inserted and secured into the arm attaching hole 2a provided in the arm support portion 2b of the cross member 2. Further, the bush 21 is rotatably accommodated in the arm attaching tube member 20. Consequently, the bush 21 is equipped to the cross member 2 in such a manner that the bush 21 is rotatable about the rotational axis CL.

The bush 21 is sandwiched between the two branching parts at an end of the lower arm 13. Specifically, the bush 21 is sandwiched between the respective ends of the two wall portions 131 that are opposed to each other. A nut 13N is fastened onto a bolt member 13B that is passed from one of the two attaching holes 13a to the other one of the two attaching holes 13a through the through-hole 21b provided at the center of the bush 21, thus fastening the lower arm 13 and the bush 21 to each other. The through-hole 21b is located on the central axis of the bush 21. As mentioned above, the central axis of the bush 21 is aligned with the rotational axis CL, and thus the through-hole 21b is located on the rotational axis CL. Consequently, the lower arm 13 is fixed to the bush 21 at a position on the rotational axis CL.

Figure 4:
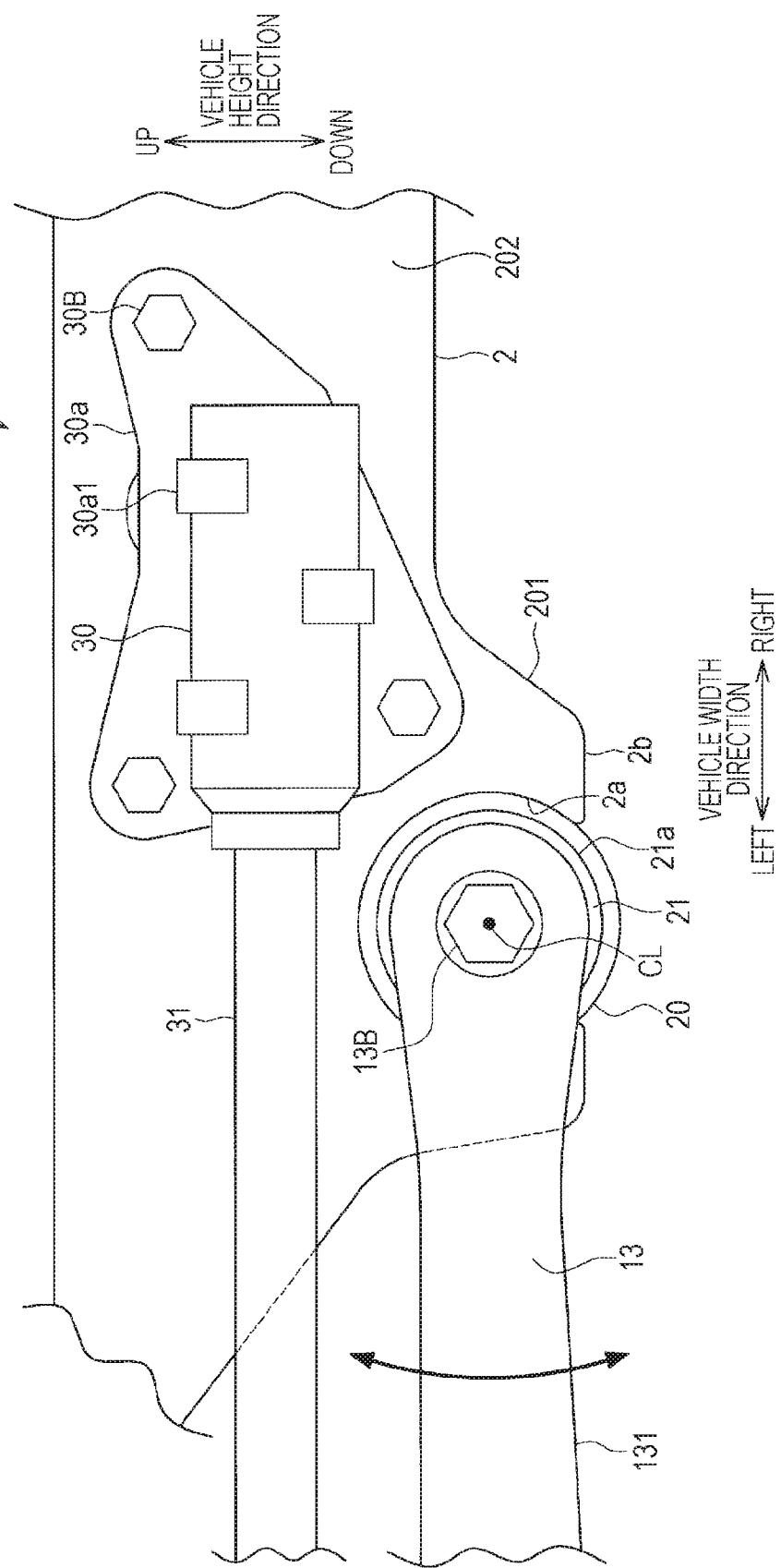
FIG. 4 illustrates the rear side of a cross member to which a lower arm and an electric actuator are attached.

FIG. 4 illustrates the rear side of the cross member to which the lower arm and the electric actuator are attached.

As mentioned above, the bush 21 is equipped to the cross member 2 (the arm attaching tube member 20) in such a manner that the bush 21 is rotatable about the rotational axis CL. Consequently, as illustrated in FIG. 4, the lower arm 13 fastened to the bush 21 is able to swing upward and downward about the rotational axis CL.

As illustrated in FIG. 4, the attaching plate 30a is attached to the cross member 2. The attaching plate 30a is disposed so as to overlap the rear side 202 of the cross member 2.

The electric actuator 30 is attached to the attaching plate 30a. The attaching plate 30a is fastened in place with the fastening bolt 30B screwed into each of the actuator attaching holes 2h (see FIG. 3) provided in the cross member 2. In this embodiment, the actuator attaching holes 2h are located in the vicinity of the arm attaching hole 2a. Consequently, the area in the vicinity of the arm attaching hole 2a and the area in the vicinity of the actuator attaching holes 2h are connected to each other by the attaching plate 30a, thus reinforcing the cross member 2 in this connected portion.

As described above, in this embodiment, the attaching plate 30a for attaching the RTC device 3 (the electric actuator 30) to the cross member 2 serves as a reinforcing member that reinforces the cross member 2. Attaching the attaching plate 30a (reinforcing member) to the cross member 2 reinforces the cross member 2.

Alternatively, the electric actuator 30 may be locked onto the attaching plate 30a by means of a locking claw 30a1 provided in the attaching plate 30a, or the housing of the electric actuator 30 may be secured onto the attaching plate 30a by welding, for example.

As described above, in the subframe structure for a vehicle 1 (see FIG. 1) according to this embodiment, the bush 21 (see FIG. 2B) fits into the arm attaching hole 2a (see FIG. 2B) provided in the arm support portion 2b, which is the downwardly protruding part of the lower end portion 201 (see FIG. 2B) of the cross member 2, with the arm attaching tube member 20 (see FIG. 2B) interposed between the bush 21 and the arm attaching hole 2a. The bush 21 is rotatable about the rotational axis CL with respect to the cross member 2 (see FIG. 2B). The lower arm 13 (see FIG. 2A) is attached to the bush 21. The lower arm 13 extends in the width direction of the vehicle. If the cross member 2 extends in the width direction of the vehicle, the rotational axis CL extends in the longitudinal direction of the vehicle. Consequently, the lower arm 13 is able to swing upward and downward about the rotational axis CL.

As illustrated in FIG. 2B, the arm attaching hole 2a of the cross member 2 is a circular through-hole. The arm attaching hole 2a has the exposed portion 2a1 at a position below the rotational axis CL, so that the lower part of the arm attaching hole 2a is exposed. As illustrated in FIG. 4, the outer surface 21a of the bush 21 retained in the arm attaching hole 2a protrudes downward beyond the lower end portion 201 of the cross member 2. That is, the cross member 2 retains the bush 21 in such a manner that the outer surface 21a of the bush 21 protrudes downward beyond the lower end portion 201. Thus, the position at which to attach the bush 21 can be lowered to such a position that the outer surface 21a protrudes downward beyond the lower end portion 201 of the cross member 2. In other words, the rotational axis CL about which the bush 21 rotates can be positioned as low as possible with respect to the cross member 2, which in turn allows the bush 21 to be attached to the lowermost part of the cross member 2.

As illustrated in FIG. 4, the bush 21 is accommodated in the arm attaching tube member 20 and thus the outer surface 21a of the bush 21 is not exposed in this embodiment. In this case, as illustrated in FIG. 4, it suffices that the arm attaching tube member 20 and the bush 21 be disposed in such a manner that the lowermost part of the outer surface 21a of the bush 21 is located below the lower end portion 201 of the cross member 2.

Since the lower arm 13 (see FIG. 2A) is fixed to the bush 21 at a position on the rotational axis CL, the lower arm 13 can be attached to a lower part of the cross member 2. This allows the lower arm 13 to be attached at a position as low as possible with respect to the cross member 2. Consequently, the lower arm 13 can be positioned at the lowest possible height above the ground, thus increasing the freedom of geometry of the lower arm 13.

As illustrated in FIG. 4, the attaching plate 30a of the electric actuator 30 is fastened in the vicinity of the arm support portion 2b of the cross member 2. Consequently, the cross member 2 is reinforced in the vicinity of the arm support portion 2b. More specifically, the attaching plate 30a serves as a bridge over an area in the vicinity of the arm attaching hole 2a with an area in the vicinity of the device attaching portion (the actuator attaching holes 2h illustrated in FIG. 3), and thus the cross member 2 is reinforced in this bridged and connected portion. Consequently, vibrations caused by swinging movement of the lower arm 13 are effectively suppressed by the cross member 2, leading to, for example, improved drive feel for the driver. Since the cross member 2 is reinforced at the position where the electric actuator 30 is to be attached, the electric actuator 30 is securely fixed to the cross member 2.

As illustrated in FIG. 2A, one end of the lower arm 13 divides into two branching parts. The bush 21 (see FIG. 2B) is sandwiched between the two branching parts, and the lower arm 13 is attached to the bush 21. As illustrated in FIGS. 3 and 4, the lower arm 13 is disposed so as to sandwich the cross member 2 between its two branching parts. Consequently, the lower arm 13 prevents detachment of the bush 21. This eliminates the need to use another member to prevent detachment of the bush 21, thus achieving a simple structure. Cost reduction is also achieved.

The present disclosure may be modified as appropriate without departing from the scope of the present disclosure.

For example, the lower arm 13 illustrated in FIG. 2A may be attached to the bush 21 illustrated in FIG. 2B in such a manner that the lower arm 13 is able to move rotationally about the rotational axis CL. In this case, the bush 21 may be fixed to the arm attaching tube member 20 or the cross member 2.

The relationship among the frame thickness Wf (see FIG. 2B) of the cross member 2, the length Lb (see FIG. 2B) of the arm attaching tube member 20, and the height Hb (see FIG. 2B) of the bush 21 is not particularly limited. For example, the frame thickness Wf of the cross member 2, the length Lb of the arm attaching tube member 20, and the height Hb of the bush 21 may be substantially equal (Wf≈Lb≈Hb).

In an alternative configuration, the frame thickness Wf of the cross member 2 and the length Lb of the arm attaching tube member 20 may be substantially equal (Wf≈Lb), and the height Hb of the bush 21 may be greater than the length Lb of the arm attaching tube member 20 (Hb>Lb).

As illustrated in FIG. 2A, an end of the lower arm 13 according to this embodiment divides into two branching parts. However, the present disclosure is not limited to this configuration. The lower arm 13 may not divide into two branching parts. In this case, any structure suffices as long as the bolt member 13B (see FIG. 3) is passed from a single attaching hole 13a to fix the bush 21 (see FIG. 2B) to the lower arm 13.

As illustrated in FIG. 2B, the arm attaching hole 2a according to this embodiment is provided in the arm support portion 2b, which is the downwardly bulging part of the lower end portion 201 of the cross member 2. However, the present disclosure is not limited to this configuration. The arm attaching hole 2a may be provided in the cross member 2 that does not have the arm support portion 2b.

As illustrated in FIG. 3, the lower arm 13 according to this embodiment is fastened to the bush 21 with the bolt member 13B. However, the present disclosure is not limited to this configuration. The lower arm 13 and the bush 21 may be bonded to each other with an adhesive, for example.

The cross member 2 may not necessarily have a U-shaped cross-section that is open at the top. For example, the top open part of the U shape may be bent so that the cross member 2 has a closed rectangular cross-section, or the cross member 2 used may be made of a solid steel member. Alternatively, the cross member 2 used may be made of a steel member having a different cross-sectional shape such as an H-shape.

As illustrated in FIG. 4, the attaching plate 30a according to this embodiment is fastened to the cross member 2 with the fastening bolt 30B. However, the present disclosure is not limited to this configuration. The attaching plate 30a may be fixed to the cross member 2 by another method such as welding (for example, spot welding) or brazing.

What is claimed is:

1. A subframe structure for a vehicle, comprising:
   a cross member that extends in a width direction of the vehicle, a lower arm extending in the width direction of the vehicle and having an attaching hole;
   the lower arm supporting a wheel support member and supported by the attaching hole of the cross member so as to move rotationally about a rotational axis defined by the attaching hole in a manner that allows the wheel support member to be displaced in a height direction of the vehicle; and
   a bush that is cylindrically shaped and axially supported by the attaching hole of the cross member such that the bush has a central axis to rotate around the rotational axis, wherein
   the lower arm is fixed to the bush at a position on the rotational axis,
   the attaching hole is formed at a lower portion of the cross member and has an opening along the rotational axis that opens downward in the height direction of the vehicle, and
   the cross member retains the bush in such a manner that a circumferential outer surface of the bush in part protrudes downward in the height direction of the vehicle beyond a lower end of the lower portion of the cross member.

2. The subframe structure for a vehicle according to claim 1, further comprising:
   a toe angle changing device that changes a toe angle of a wheel supported on the wheel support member, the toe angle changing device being attached to the cross member at a device attaching portion thereof, and
   a reinforcing member attached to the cross member in a manner that bridges surfaces of the cross member, the surfaces comprising an area in a vicinity of the device attaching portion and an area in a vicinity of the attaching hole to reinforce the cross member.

3. The subframe structure for a vehicle according to claim 2, wherein the reinforcing member is an attaching plate that attaches the toe angle changing device to the cross member.

4. The subframe structure for a vehicle according to claim 1, wherein:
   the lower portion of the cross member has an arm support portion bulging downward in the height direction of the vehicle, and
   the attaching hole is formed in the arm support portion.

5. The subframe structure for a vehicle according to claim 1, further comprising an attaching tube member that has a cylindrical shape and is axially retained in the attaching hole,
   wherein the bush is axially held in the attaching tube member in a manner that allows the bush to rotate about the rotational axis.

6. The subframe structure for a vehicle according to claim 5, wherein the cross member retains the attaching tube member in a manner that embraces the attaching tube in the attaching hole.

7. The subframe structure for a vehicle according to claim 1, wherein the lower arm at one end thereof divides into two branching parts, and the lower arm is fixed to the bush in a state in which the bush is sandwiched between the two branching parts of the lower arm.

* * * * *